United States Patent
Schmidt et al.

(10) Patent No.: US 9,566,900 B2
(45) Date of Patent: Feb. 14, 2017

(54) DRIVER ASSISTANCE SYSTEM AND OPERATING PROCEDURE FOR THE LATTER

(71) Applicant: GM GLOBAL TECHNOLOGY OPERATIONS LLC, Detroit, MI (US)

(72) Inventors: Gerald Schmidt, Frankfurt am Main (DE); Marco Moebus, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 41 days.

(21) Appl. No.: 14/341,612

(22) Filed: Jul. 25, 2014

(65) Prior Publication Data

US 2015/0028741 A1    Jan. 29, 2015

(30) Foreign Application Priority Data

Jul. 25, 2013 (DE) .................. 10 2013 012 325

(51) Int. Cl.
| | |
|---|---|
| *B60Q 1/14* | (2006.01) |
| *B60Q 1/02* | (2006.01) |
| *B60Q 1/16* | (2006.01) |
| *G06K 9/00* | (2006.01) |
| *G08G 1/16* | (2006.01) |

(52) U.S. Cl.
CPC ............. *B60Q 1/1423* (2013.01); *B60Q 1/02* (2013.01); *B60Q 1/143* (2013.01); *B60Q 1/16* (2013.01); *G06K 9/00791* (2013.01); *B60Q 2300/322* (2013.01); *B60Q 2300/42* (2013.01); *G08G 1/166* (2013.01)

(58) Field of Classification Search
CPC ............ B60Q 1/02; G07C 5/0891; H04N 5/57

USPC    315/77, 80, 82; 348/148, 342, 370; 340/988
See application file for complete search history.

(56) References Cited

U.S. PATENT DOCUMENTS

| | | | |
|---|---|---|---|
| 2003/0160153 A1* | 8/2003 | Hara ...................... | H04N 5/202 250/214 VT |
| 2006/0184297 A1* | 8/2006 | Higgins-Luthman ..... | B60R 1/00 701/41 |
| 2006/0274149 A1* | 12/2006 | Yoshizawa .......... | B60R 21/0134 348/148 |
| 2008/0062010 A1* | 3/2008 | Kobayashi ......... | G06K 9/00798 340/937 |
| 2012/0050074 A1* | 3/2012 | Bechtel .................... | B60R 1/04 340/988 |
| 2015/0016678 A1* | 1/2015 | Imaeda ............... | B60W 30/095 382/103 |

FOREIGN PATENT DOCUMENTS

| | | |
|---|---|---|
| DE | 102004033705 A1 | 2/2006 |
| DE | 102008059630 A1 | 6/2010 |
| DE | 102011076341 A1 | 11/2012 |
| WO | 2008064621 A1 | 6/2008 |

* cited by examiner

*Primary Examiner* — Tung X Le
(74) *Attorney, Agent, or Firm* — Lorenz & Kopf LLP

(57) ABSTRACT

A driver assistance system is disclosed which automatically control the high and low beam of a headlamp on a vehicle. The system includes a camera and an image evaluation unit configured to search images acquired by the camera for initial bright zones that correspond with an activated vehicle headlamp, and to switch the headlamp from a high beam to a low beam upon detecting both a first bright zone and a second bright zone that is larger and less bright than the image of the activated vehicle headlamp.

13 Claims, 2 Drawing Sheets

DRIVER ASSISTANCE SYSTEM AND OPERATING PROCEDURE FOR THE LATTER

CROSS REFERENCE TO RELATED APPLICATION

This application claims priority to German Patent Application No. 102013012325.9 filed Jul. 25, 2013, which is incorporated herein by reference in its entirety.

TECHNICAL FIELD

The technical field relates to a driver assistance system for automatically controlling a light on a vehicle, in particular a high beam headlamp.

DE 10 2004 033 705 A1 discloses a conventional driver assistance system that includes a radar sensor, the radiation from which is reflected by an external object, such as an oncoming vehicle, and again caught by the sensor. Vehicles that have no direct line of sight relative to the radar sensor are not hit by the radiation, and cannot be detected. Alternatively or additionally to the radar sensor, a camera may be used to provide images which are analyzed by an image processor to determine whether they show a motor vehicle. In practice, an oncoming vehicle can only be discerned in the images of such a camera based on the two bright zones captured in the image from its headlamps. The headlamps usually outshine the outlines of the vehicle body.

Since both the radar sensor and camera require a line of sight relative to the oncoming vehicle so that the latter can be detected and the headlamp switch from high beam to low beam, the driver of an oncoming vehicle unavoidably gets temporarily illuminated by the high beam in the period between when the vehicle first becomes visible and then is detected by the driver assistance system and the headlamp is switched from high beam to low beam.

SUMMARY

In one embodiment, the present disclosure provides a driver assistance system for automatically controlling a light on a vehicle in such a way as to minimize the risk that an oncoming road user will get temporarily illuminated by a high beam of a headlamp. The driver assistance system includes a camera and an image evaluation unit set up to search images provided by the camera for initial bright zones that depict an activated vehicle headlamp, and to turn down the headlamp upon detecting both a first bright zone and a second bright zone that is larger and less bright than the image of an activated vehicle headlamp. To wit, headlamps in many instances are not the first light of an oncoming vehicle that becomes visible upon approaching an oncoming vehicle, with the light instead emanating from objects illuminated by the headlamps of the oncoming vehicle. These objects cannot be brighter than the headlamps illuminating them, and generally are larger than the latter. In this regard, a bright object or a plurality of bright objects made visible in a camera image can be identified as illuminated by the headlamps of an oncoming vehicle if the expansion of a bright zone in the image corresponding to these objects is too large and the brightness too small to be interpreted as the image of a vehicle headlamp.

In order to ensure that such a second bright zone is actually detected only in the dark, it can be provided for the detection of a second bright zone by the image evaluation unit that the portion of this second bright zone on the surface of an image be smaller than that of a simultaneously acquired dark zone. Even before an oncoming vehicle becomes visible, its approach can be discerned based on how the light from its headlamps is scattered on haze, fog or mist, in particular fine water droplets, which can form in the cooling night air at a high atmospheric humidity. Such scattered light becomes clearly visible in particular when a vehicle equipped with the driver assistance system and second vehicle approach each other from opposite directions of a hilltop. In this case, the hill blocks any direct sight on the headlamps of the other vehicle, but the scattered light is readily visible against the backdrop of the night sky. To adjust to such a situation, it is advantageous for the image evaluation unit to be configured to detect the second bright zone in particular if it lies over the horizon and its edge continuously passes over into the dark zone.

In addition, the image evaluation unit can be configured to detect the second bright zone in particular if it contains a bright object against a dark background. While such an object can in particular involve an object on the side of the road illuminated by the headlamps of the other vehicle, the area of the road surface illuminated by the headlamps can also be engulfed by darkness.

Another alternative would be to detect the second bright zone in particular if it forms a bright background behind a dark object. For example, such a bright background can be formed by the roadway lying directly ahead of the oncoming vehicle, or by objects on the roadside that are illuminated by the oncoming vehicle, which are partially concealed from the vehicle equipped with the driver assistance system behind objects that are not illuminated, like trees on the roadside.

The probability of correctly detecting a second bright zone can be improved by coupling the image evaluation unit to a map database and localizing device for determining the geographic position of the vehicle, and configuring the image evaluation unit to consider information in the map database upon detection of the second bright zone. Such a map database and localizing device are combined in vehicle navigation devices known in the art. For example, if the second bright zone is traced back to a diffuse scattering of light on the haze, fog or mist, the readiness of the image evaluation unit to detect such a second bright zone can best be enhanced if the route lying ahead of the vehicle exhibits a hilltop. Similarly, the readiness of the image evaluation unit to detect the second bright zone should be enhanced if the route lying ahead of a vehicle exhibits a curve, and the bright object is situated on the outside of the curve, so that it can be illuminated by a vehicle approaching on a blind section of the route on the far side of the curve.

In addition, the readiness of the image evaluation unit to detect the second bright zone can be enhanced if the route lying ahead of the vehicle exhibits a curve, and the dark object is situated on the inside of the curve against a bright background. In addition, the image evaluation unit can be connected with a C2C interface, and the readiness of the evaluation unit to detect the second bright zone can be enhanced if a C2C signal from second vehicle is received. The presence of such a signal at the very least indicates that second vehicle is nearby, so that the possibility that it will soon appear in the field of view cannot be ruled out. In order to more precisely assess the probability that such a vehicle will become visible, the image evaluation unit is best set up to extract information about the position, traveling direction, steer angle and/or speed of the other vehicle from the C2C signal.

In another embodiment, the present disclosure provides a device and method for automatically controlling a headlamp on a vehicle as follows: (i) receiving an image of the environment lying ahead of the vehicle; (ii) scanning the image for a first bright zone that depicts an actuated vehicle headlamp; (iii) scanning the image for a second bright zone that is larger and less bright than expected for depicting an activated vehicle headlamp; (iv) switching the headlamp from a high beam to a low beam upon detecting a first bright zone; and (v) turning off the light as well upon detecting a second bright zone.

The subject matter of the present disclosure further relates to a computer program product that encompasses instructions, which when executed on a computer allow it to operate as an image evaluation unit in a driver assistance system as described above, or to implement the method described above. The subject matter of the present disclosure further relates to a non-transitory computer readable medium on which are recorded program instructions that allow a computer to operate in the way mentioned above.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
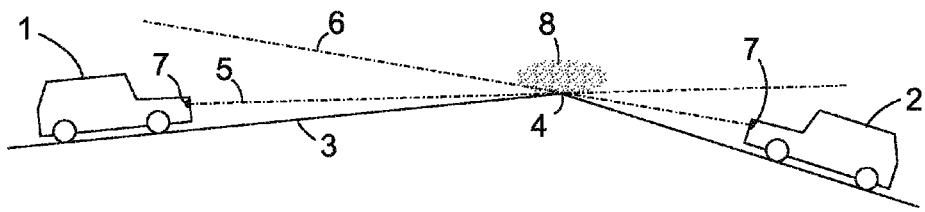
FIG. 1 is a first application situation representative of the present disclosure.

FIG. 1 presents a schematic view of two vehicles, a first or ego-vehicle 1 equipped with a driver assistance system for automatically switching the high beam and a second or oncoming vehicle 2, which approach a hilltop 4 in the dark on the same road 3 in opposite directions as the first vehicle 1. As evident from dot-dashed lines 5, 6, the light beams from the front headlamps 7 of both vehicles are obscured from each other by the hilltop 4, so that neither driver can see the headlamps 7 of the respectively oncoming vehicle. However, when the night air cools and the atmospheric humidity is high enough, fine droplets can form and scatter the light from the headlamps 7. In such a situation, an approach by the second vehicle 2 can be discerned from the perspective of the first vehicle 1 by virtue of the fact that a diffusely illuminating cloud of haze, fog or mist 8 (hereinafter "haze") is outlined against the dark night sky over the road 3 in the area of the hilltop 4.

Figure 2:
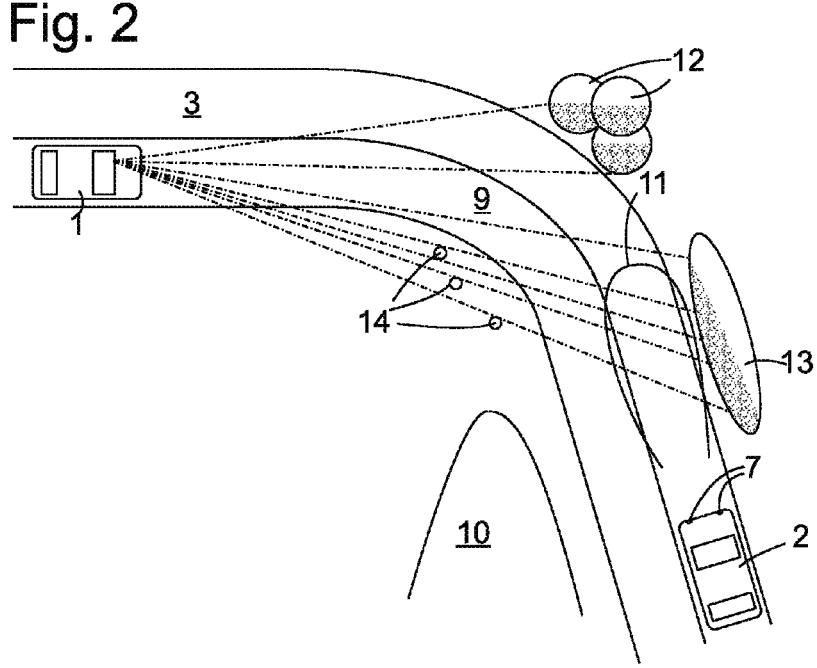
FIG. 2 is a second application situation.

FIG. 2 shows a second typical application situation. First vehicle 1 and second vehicle 2 approach a curve 9 from opposite directions. The second vehicle 2 is not visible from the perspective of the first vehicle 1, for example because it is still hidden behind a building, an elevated terrain 10 or the like. If the road 3 exhibits a suitable vertical profile, i.e., in particular if it is flat or declines from at least one direction toward the curve 9, it must be expected from the perspective of the first vehicle 1 that an area 11 of the roadway illuminated by the front headlamps 7 of the second vehicle 2 will be visible earlier than the second vehicle 2 itself. However, even if the vertical profile of the road 3 is such that no road surface illuminated by the second vehicle 2 becomes visible from the perceptive of the first vehicle 1, the approach of the second vehicle 2 can be discerned from the objects on the side of the road that it lights up, here for example trees 12 on the outside of the curve 9, which are illuminated by the second vehicle 2, openly visible from the first vehicle 1, and readily discernible against the backdrop of an unlit, dark countryside.

The area 11 of the road surface illuminated by the oncoming vehicle 2, or also an object on the roadside, here a clump of bushes 13, can be discerned by the first vehicle 1 even if partially obscured by objects on the inside of the curve 9, such as by the trunks 14 of trees. In the example shown here, the trunks 14 are not encompassed by the light beam of the second vehicle 2, and thus form dark silhouettes in front of the objects illuminated by the second vehicle 2, such as the roadway area 11 or the clump of bushes 13. But even if the light from the second vehicle 2 were to hit the trunks 14, it would only illuminate them on one side essentially facing away from the first vehicle 1, so that they would in this case also stand out as dark against a bright background.

Figure 3:
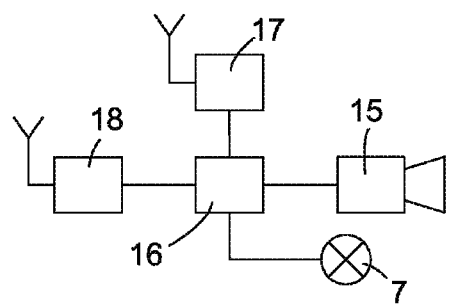
FIG. 3 is a block diagram of the driver assistance system according to the present disclosure.

The first vehicle 1 is equipped with a driver assistance system for controlling its high beam, which is presented on FIG. 3 as a block diagram. It encompasses a camera 15 pointed toward the front in the traveling direction 1 of the first vehicle 1, so as to acquire the road 3 and side of the road lying ahead of the first vehicle 1. The viewing angle of the camera 15 should be greater than the light beam of the headlamp 7 of the first vehicle 1, so as to acquire in particular those areas in the environment where the reflection of lights from an oncoming vehicle is clearly discernible without being outshined by the headlamps of the first vehicle 1.

The camera 15 delivers its images to the image evaluation unit 16, which is further coupled to a navigation device 17 and/or a C2C radio interface 18. The image evaluation unit 16 can procure information from the navigation device 17 about the environment of the first vehicle 1, such as the course of the road 3, vertical profile, development and/or vegetation on the roadside, which is usually contained in the map data stored in the navigation device 17. The C2C radio interface 18 can be used to receive signals from other vehicles equipped with corresponding interfaces, which provide information about the presence of such vehicles, and possibly about their position, traveling direction and/or speed.

Figure 4:
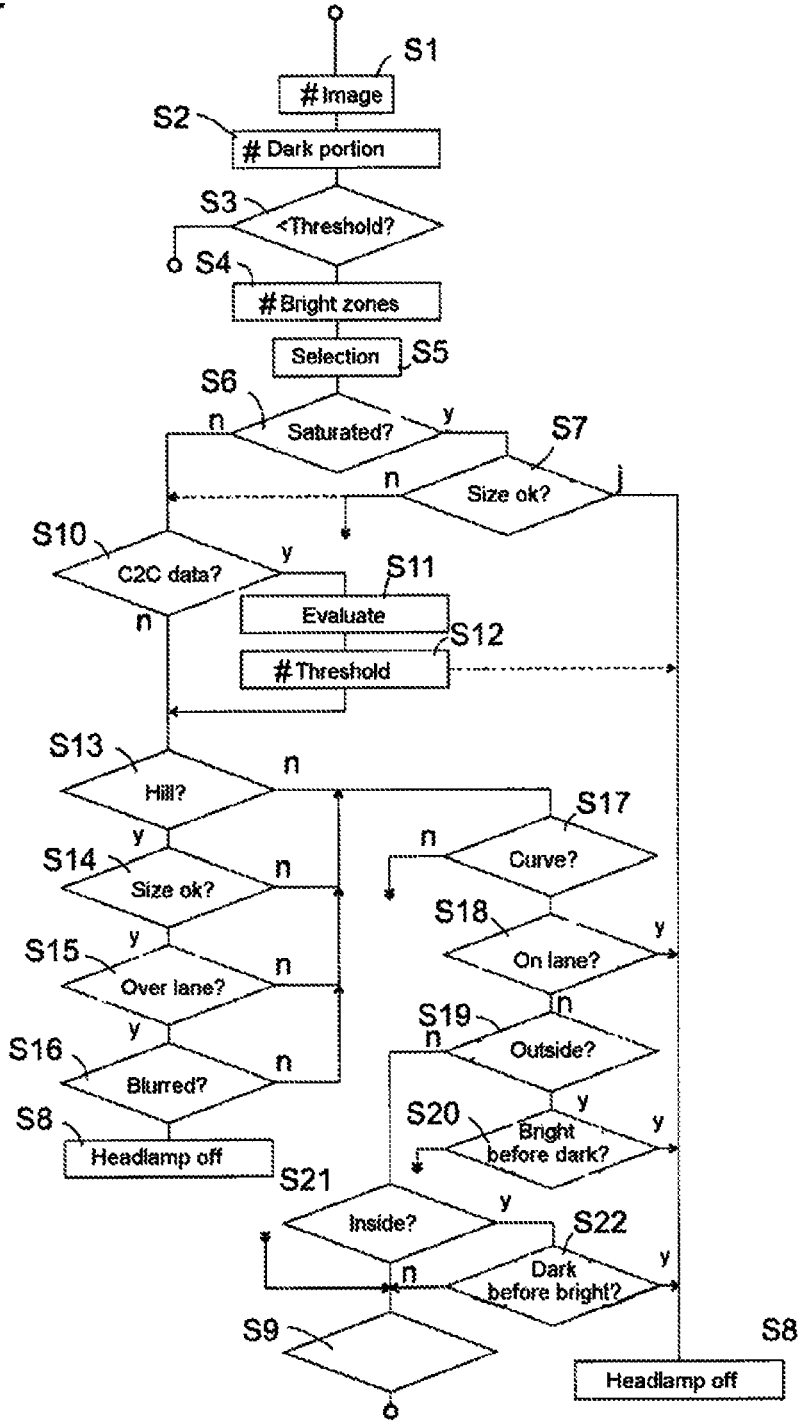
FIG. 4 is a flowchart for an operating procedure for a driver assistance system according to the present disclosure.

FIG. 4 presents a flowchart for an operating procedure carried out by the image evaluation unit 16. The image evaluation unit 16 receives an image of the environment from the camera 15 at regular time intervals in step S1. In step S2, the dark portion of the image is determined, i.e., the portion of the image surface whose brightness lies below a prescribed limit. Since the camera 15 must use different enhancements and/or integration times to balance out varying environmental brightness levels, information from the camera about these parameters can also be drawn upon to assess whether the vehicle 1 is moving in a dark environment, e.g., along an unlit road at night or through an unlit tunnel.

If it is determined that the dark portion of the image lies under a threshold or the exposure parameters of the image point to a bright environment, processing is terminated in step S3. By contrast, if it is determined that an image essentially reveals darkness, bright zones of the image are determined in step S4, i.e., areas of the image whose brightness clearly exceeds that over the predominant part of an image. Such bright zones can typically be found in any image, specifically at the very least the reflections of those objects that were hit by the light beam from the headlamps 7 of the first vehicle 1 itself. If the latter are absent, a warning can be issued to the driver, prompting him or her to turn on the headlamps 7.

One of the bright zones is selected in step S5. Its brightness is analyzed in step S6. If the selected bright zone is the image of an activated headlamp of an oncoming vehicle, it must be expected at least in a central part of this bright zone that the photoreceptors of the camera 15 will reach high brightness values, and typically even be saturated. If the camera 15 is a color camera, the existence of a central part of the bright zone in which the photoreceptors for all colors are saturated represents a strong indicator that a headlamp is depicted. Therefore, if a strong brightness or saturation is observed, step S7 checks whether the size of the respective bright zone can be reconciled with the assumption that a vehicle headlamp is involved. Information derived from the image of the camera 15, or for example the output of a radar sensor, about the distance of the light and the resultant scale of its image can be drawn upon for this purpose. Taking this scale into account, if the size of the bright zone can be reconciled with the assumption that the image depicts a headlamp, the image evaluation unit 16 turns off the high beam on the front headlamps 7 of the first vehicle 1 at step S8.

If in step S7 the size of the bright zone does not fit the assumption that the image depicts a headlamp, processing can skip ahead to step S9, in which the image is checked to see if it contains yet another, unanalyzed bright zone. If "no," processing ends. If "yes," it returns to step S5 to select an as yet unanalyzed bright zone. Alternatively, the method can also jump from step S7 to step S10, which is also reached when the check of brightness in step S6 shows it to be lower than expected for the image of a headlamp.

Step S10 involves checking whether current C2C data from the interface 18 are present. In the simplest case, an evaluation of these data in step S11 can include determining that a C2C-capable vehicle is in the vicinity, and thereupon in step S12 raising the tendency of the image evaluation unit 16 to interpret the viewed bright zone as a reflection from the headlamps of such a vehicle in a manner yet to be described.

In a further developed embodiment, quantitative information contained in the C2C data, in particular relating to the position and traveling direction of the vehicle sending the information, can be considered in step S11 to decide whether this vehicle can approach the first vehicle 1 on its road 3. The evaluation of this information can already provide so unambiguous a result that the method jumps directly to S8 as denoted by a dashed arrow on the figure, wherein the high beam is turned off. If the evaluation of C2C data does not clearly reveal that a vehicle is approaching, but makes such an assumption appears plausible, a point number threshold that the viewed bright zone must reach or exceed during the ensuing analysis is lowered in step S12 so as to be interpreted as the reflection of an oncoming vehicle.

Information originating from the navigation device 17 is then drawn upon to assess the bright zone. For example, step S13 involves checking whether a hill 4 that might be concealing an oncoming vehicle 2 lies ahead on the road 3 being traveled by the first vehicle 1. If "yes," the bright zone could be an image 8 depicting a cloud of haze 8, as described with reference to FIG. 1. Such a cloud of haze should roughly be at least as wide as the road 3, and its distance away should be roughly the same as the hill 4. These assumptions are used to calculate a minimum size that the image of the cloud 8 in the picture of the camera 15 would have to have, and compare it to the size of the bright zone. If the bright zone is smaller than to be expected (and the visual field of the camera 15 is not limited by a vehicle ahead driving in the same direction), it can be assumed that an illuminated cloud of haze 8 is not at issue, and the method branches to step S17. By contrast, if the size can be reconciled with the assumption that it is a cloud of haze 8, the latter is checked at step S15 to see if it lies over the lane of the road 3. If this is not the case, the assumption becomes that the bright zone was caused by something else, and the method again returns to step S17.

In addition, the image depicting a cloud of haze 8 should at least locally have blurred edges, i.e., be continuously passing over into a dark zone. If this criterion also proves to be met in step S16, the bright zone is identified as the image of a cloud of haze 8 lit up by oncoming traffic, and the high beam is turned off (S8).

If the assumption that the bright zone involves an illuminated cloud of haze 8 is not confirmed in any of the above steps S13-S16, the road 3 is checked in step S17 to see whether a curve 9 lies ahead of it. If this is not the case, oncoming traffic should be discernible from its directly visible headlamps, and should have already been identified in step S7. In this case, processing of the selected bright zone therefore ends at this juncture, and the method jumps to the already expanded step S9.

For the sake of completeness, let it be noted that the word curve can here be understood as any course taken by the road that turns or forces a change in direction of a vehicle, i.e., in particular to include a road junction.

Step S18 checks whether the bright zone on the image of the lane lying ahead of the first vehicle 1 is the road 3. If "yes," there is a high probability that another, not yet visible vehicle is illuminating the road 3. If the dimensions of the illuminated lane area (corresponding to area 11 on FIG. 2) and its brightness can be reconciled with the assumption that a reflection from an oncoming vehicle is involved, the method switches over to step S8. The more likely the C2C data make it appear that there is another oncoming vehicle 2, the wider the interval limits for size and brightness within which the examined bright zone must lie can be set beforehand in step S12.

If the bright zone is not on the roadway, then the next most probable assumption is checked in step S19, which involves determining whether it lies on the outside of the curve 9, and thus might be attributable to illuminated objects located there, such as the trees 12 on FIG. 2. If "yes," the distance away from an illuminated object 12 is estimated in step S20, for example based on radar data or in a comparison with an earlier image delivered by the camera 15, so as to assess whether the latter appears against a dark background. If so, the plausible assumption is that it is being illuminated by an oncoming vehicle 2, and the high beam is turned off, or in other words the headlamp is switched to a low beam, at step S8.

Conversely, if it is determined in step S21 that the bright zone is situated on the inside of the curve 9 from the perspective of the first vehicle 1, then dark objects in front, such as the tree trunks 14, serve as indicator that the illuminated object, such as the clump of bushes 13, is located on the far side of the curve 9 on the edge of the road from the perspective of the first vehicle 1, and the assumption in this case also becomes that second vehicle 2 is approaching at step S22, and the high beam is turned off.

If the bright zone is not located on either the road itself or anywhere near the curve 9, it is assumed that it cannot be attributed to an oncoming vehicle, and the method switches to step S9. If none of the bright zones on the image can be attributed to an oncoming vehicle, the method ends with an analysis of the last bright zone, and the high beam remains turned on at least until such time as the procedure is repeated.

Turning the high beam back on, or in other words switching the headlamp to high beam can be left to the driver. However, it can also be provided that the high beam be turned back on automatically, for example by regularly repeating the procedure in FIG. 4 even with the high beam turned off, and turning the high beam back on, either after the conditions for deactivating the high beam at step S8 have been absent over a prescribed span of time, or once the headlamps of the oncoming vehicle identified in step S7 are no longer in a subsequently taken picture. In this case, it must be assumed that the vehicles 1, 2 have passed by each other.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A driver assistance system for automatically controlling a headlamp on a vehicle comprising:
   a camera arranged on the vehicle to acquire images ahead of the vehicle; and
   an image evaluation unit configured to search the images acquired by the camera for an initial bright zone representing an activated vehicle headlamp, and to adjust the headlamp on the vehicle when both a first bright zone and a second bright zone that is larger and less bright than the image of an activated vehicle headlamp are detected,
   wherein the image evaluation unit is configured to detect a second bright zone only when its portion of the image surface is smaller than that of a dark zone (S2, S3).

2. The driver assistance system according to claim 1, wherein the image evaluation unit is configured to detect the second bright zone in particular when at least one of the following conditions is satisfied: the second bright zone lies over the horizon or the second bright zone continuously passes over into a dark zone.

3. The driver assistance system according to claim 1, wherein the image evaluation unit is configured to detect when the second bright zone contains a bright object against a dark background.

4. The driver assistance system according to claim 1, wherein the image evaluation unit is configured to detect when the second bright zone forms a bright background behind a dark object.

5. The driver assistance system according to 1 wherein the headlamp comprises a high beam and a low beam, and wherein the evaluation unit adjusts the headlamp from the high beam to the low beam.

6. A computer programming product that encompasses instructions, which when executed on a computer to execute an image evaluation unit in a driver assistance system according to claim 1.

7. A non-transitory computer readable medium on which are recorded program instructions that allow a computer to operate as an image evaluation unit in a driver assistance system according to claim 1.

8. A driver assistance system for automatically controlling a headlamp on a vehicle comprising:
   a camera arranged on the vehicle to acquire images ahead of the vehicle; and
   an image evaluation unit configured to search the images acquired by the camera for an initial bright zone representing an activated vehicle headlamp, and to adjust the headlamp on the vehicle when both a first bright zone and a second bright zone that is larger and less bright than the image of an activated vehicle headlamp are detected,
   wherein the image evaluation unit is operably coupled to a map database and localizing device for determining the geographic position of the vehicle, and is further configured to consider information in the map database upon detection of the second bright zone.

9. The driver assistance system according to claim 8, wherein the evaluation unit is configured to consider information in the map database indicating a route laying ahead of the vehicle, and wherein a readiness of the image evaluation unit to detect the second bright zone is enhanced when the route lying ahead of the vehicle exhibits a hilltop.

10. The driver assistance system according to claim 8, wherein the evaluation unit is configured to consider information in the map database indicating a route laying ahead of the vehicle, and wherein a readiness of the image evaluation unit to detect the second bright zone is enhanced when the route lying ahead of the vehicle exhibits a curve and the bright object is situated on the outside of the curve.

11. The driver assistance system according to claim 8, wherein the evaluation unit is configured to consider information in the map database indicating a route laying ahead of the vehicle, and wherein a readiness of the image evaluation unit to detect the second bright zone is enhanced when the route lying ahead of the vehicle exhibits a curve and the dark object is situated on the inside of the curve.

12. A driver assistance system for automatically controlling a headlamp on a vehicle comprising:
   a camera arranged on the vehicle to acquire images ahead of the vehicle; and
   an image evaluation unit configured to search the images acquired by the camera for an initial bright zone representing an activated vehicle headlamp, and to adjust the headlamp on the vehicle when both a first bright zone and a second bright zone that is larger and less bright than the image of an activated vehicle headlamp are detected,
   wherein the image evaluation unit is operably coupled with a C2C interface, and a readiness of the image evaluation unit to detect the second bright zone is enhanced when a C2C signal from another vehicle is received by the C2C interface.

13. The driver assistance system according to claim 12, wherein the image evaluation unit is configured to extract information about the position, traveling direction, steer angle and/or speed of the other vehicle from the C2C signal.

* * * * *